(12) United States Patent
Halbauer et al.

(10) Patent No.: US 8,958,407 B2
(45) Date of Patent: Feb. 17, 2015

(54) METHOD FOR ALLOCATING FREQUENCY SUBCHANNELS ON AN AIR INTERFACE OF A WIRELESS COMMUNICATION SYSTEM AND CORRESPONDING RADIO RESOURCE ALLOCATION MODULE

(75) Inventors: Hardy Halbauer, Ettlingen (DE); Stephan Saur, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 1455 days.

(21) Appl. No.: 12/433,140

(22) Filed: Apr. 30, 2009

(65) Prior Publication Data

US 2009/0279494 A1 Nov. 12, 2009

(30) Foreign Application Priority Data

May 6, 2008 (EP) .................................. 08305150

(51) Int. Cl.
*H04H 20/67* (2008.01)
*H04L 5/00* (2006.01)
*H04W 72/04* (2009.01)
*H04W 16/12* (2009.01)

(52) U.S. Cl.
CPC ............ *H04L 5/0028* (2013.01); *H04L 5/0007* (2013.01); *H04L 5/0037* (2013.01); *H04L 5/0044* (2013.01); *H04W 72/048* (2013.01); *H04W 16/12* (2013.01)
USPC ............................. 370/339; 370/329; 370/335

(58) Field of Classification Search
USPC .................................. 370/319, 343, 339, 329
See application file for complete search history.

(56) References Cited

U.S. PATENT DOCUMENTS

| 5,848,358 | A | 12/1998 | Forssen et al. |
| 6,424,836 | B1 * | 7/2002 | Gil et al. ........................ 455/450 |
| 6,757,553 | B1 * | 6/2004 | English ..................... 455/562.1 |
| 6,782,277 | B1 | 8/2004 | Chen et al. |
| 6,804,521 | B2 * | 10/2004 | Tong et al. .................... 455/450 |
| 6,889,056 | B2 * | 5/2005 | Shibutani ..................... 455/522 |

(Continued)

FOREIGN PATENT DOCUMENTS

| CN | 1525782 | 9/2004 |
| CN | 1980464 | 6/2007 |

(Continued)

OTHER PUBLICATIONS

European Search Report.
(Continued)

*Primary Examiner* — Ricky Ngo
*Assistant Examiner* — Dewanda Samuel
(74) *Attorney, Agent, or Firm* — Fay Sharpe LLP

(57) ABSTRACT

The present invention relates to a method for allocating frequency subchannels on an air interface of a wireless communication system to users for a predefined time period, a plurality of frequency subchannels being available for communicating between a base station belonging to a cell and users under the coverage of said cell requiring a frequency subchannel allocation.

According to the present invention, the method comprises the steps of:

determining an angular position of the users under the coverage of a cell relative to a base station in said cell;
selecting at least one frequency subchannel to be assigned to a user depending on its angular position and the angular position of at least one other user.

12 Claims, 4 Drawing Sheets

(56) References Cited

U.S. PATENT DOCUMENTS

| | | | |
|---|---|---|---|
| 6,956,813 B2* | 10/2005 | Fukuda | 370/208 |
| 6,996,056 B2* | 2/2006 | Chheda et al. | 370/209 |
| 6,999,795 B2* | 2/2006 | Chitrapu et al. | 455/562.1 |
| 7,088,288 B1* | 8/2006 | Margolese et al. | 342/377 |
| 7,593,420 B2* | 9/2009 | Park et al. | 370/436 |
| 7,715,846 B2* | 5/2010 | Ji et al. | 455/447 |
| 8,014,781 B2* | 9/2011 | Ji et al. | 455/449 |
| 8,175,792 B2* | 5/2012 | Kim et al. | 701/117 |
| 8,731,480 B2* | 5/2014 | Kim et al. | 455/69 |
| 2002/0151309 A1 | 10/2002 | Johnson et al. | |
| 2002/0159414 A1 | 10/2002 | Kanemoto et al. | |
| 2004/0242272 A1* | 12/2004 | Aiken et al. | 455/562.1 |
| 2004/0259558 A1 | 12/2004 | Skafidas et al. | |
| 2006/0125601 A1* | 6/2006 | Onishi | 340/5.72 |
| 2007/0259635 A1* | 11/2007 | Oh et al. | 455/186.1 |
| 2008/0159249 A1* | 7/2008 | Takahashi et al. | 370/343 |

FOREIGN PATENT DOCUMENTS

| | | |
|---|---|---|
| EP | 1 416 753 A1 | 5/2004 |
| EP | 1 453 337 A1 | 9/2004 |
| EP | 1 796 417 A2 | 6/2007 |
| EP | 1796417 | 6/2007 |
| JP | 2001-285927 | 10/2001 |
| KR | 10-2002-0035163 | 5/2002 |
| KR | 10-1997-0704317 | 6/2003 |
| WO | WO 2004/086636 | 10/2004 |
| WO | WO 2005/032169 | 4/2005 |
| WO | WO 2006/067683 A2 | 6/2006 |
| WO | WO 2008/041281 A1 | 4/2008 |

OTHER PUBLICATIONS

Japanese Office Action dated Oct. 17, 2013 (including translation).
English Translation of Chinese Notification of First Office Action dated May 31, 2011.

* cited by examiner

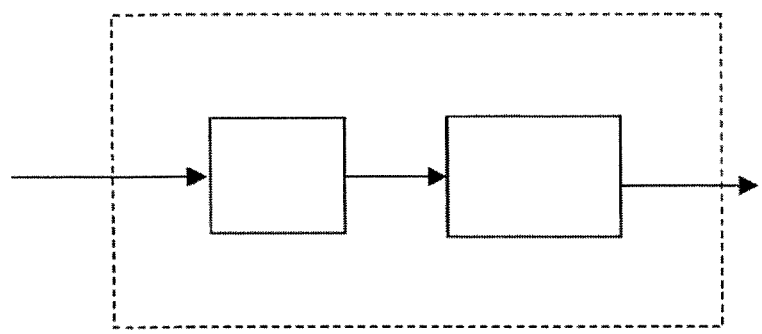
41   42   Fig. 4

METHOD FOR ALLOCATING FREQUENCY SUBCHANNELS ON AN AIR INTERFACE OF A WIRELESS COMMUNICATION SYSTEM AND CORRESPONDING RADIO RESOURCE ALLOCATION MODULE

The invention is based on a priority application EP 08 305 150.8 which is hereby incorporated by reference.

TECHNICAL FIELD

The present invention relates to a method for allocating frequency subchannels on an air interface of a wireless communication system to users.

BACKGROUND OF THE INVENTION

In multi-carrier systems, as OFDMA (Orthogonal Frequency Division Multiple Access) transmission systems, the transmitted data is split into a number of parallel data streams, each one used to modulate a separate sub-carrier. In other words, the broadband radio channel is subdivided into a plurality of narrow-band frequency subcarriers, which are grouped into subchannels, each subcarrier being independently modulated with e.g. QPSK, 16 QAM, 64 QAM or higher modulation order allowing higher data rate per subcarrier.

In such systems, the sub-carrier frequencies or subchannels can be allocated to a user channel on a short term basis (e.g. all 2 ms) as well as the modulation order per sub-carrier defining a transmission channel for each user should be updated on the same short term basis.

There are different ways to increase the overall throughput of the system.

Firstly, an efficient sub-carrier/modulation allocation should be performed to the different users, i.e when the best appropriate sub-carriers or subchannels are identified for a user, the optimal modulation to be used on these sub-carriers or subchannels should be appropriately selected. The higher modulation orders can only be used if the signal to noise and interference ratio (SINR) at the receiver is high enough to allow the demodulation.

Secondly, the network being a cellular wireless communication network, the frequency reuse should be appropriately chosen in order to reuse as many subchannels as possible in a cell without causing interference. For this purpose, the cell may be separated in sectors and subsectors and the set of available subchannels may itself be divided in a number of subchannel subsets, one predefined subchannel subset being used in one predefined subsector of the cell as shown on FIG. 1.

A cell centered on a base station BS is divided in 3 sectors A, B and C.

Each sector is further divided in 3 sub sectors A1, . . . , A3, B1, . . . , B3, C1, . . . , C3.

Assumed that N frequency subchannels are available in the network, 3 groups of subchannels may be constituted [0,n1], ]n1,n2], ]n2,N] and allocated in the following way to the sub sectors:

sub channel group [0, n1] is allocated to users in subsectors A1, B1, C1, sub channel group ]n1,n2] is allocated to users in subsectors A2, B2, C2, sub channel group ]n2, N] is allocated to users in subsectors A3, B3, C3.

This fixed allocation guarantees low inter sub-sectors interference since no situation occurs in which the same subchannel subgroup is used in two contiguous portions of the cell. This allocation scheme is a frequency reuse 1 scheme since all frequency sub channels are used simultaneously in all cells and even in all sectors of each cell. Once the frequency subgroup has been identified for a subsector, the users located in the corresponding subsector are allocated one or more of the frequency subchannels of the frequency subgroup for communicating with the base station.

It is an object of the present invention to further improve the capacity in a frequency reuse 1 wireless radio communication network.

SUMMARY OF THE INVENTION

These objects, and others that appear below, are achieved by a method for allocating frequency subchannels on an air interface of a wireless communication system to users according to claim 1, and a radio resource allocation module according to claim 9.

The method according to the present invention presents the advantage to more flexibly allocate frequency subchannels in a cell while ensuring a low inter and intra cell interference.

Further advantageous features of the invention are defined in the dependent claims.

BRIEF DESCRIPTION OF THE DRAWINGS

Other characteristics and advantages of the invention will appear on reading the following description of a preferred embodiment given by way of non-limiting illustrations, and from the accompanying drawings, in which:

FIG. 4 shows an implementation of a radio resource allocation module according to the present invention.

DETAILED DESCRIPTION OF PREFERRED EMBODIMENTS

Figure 1:
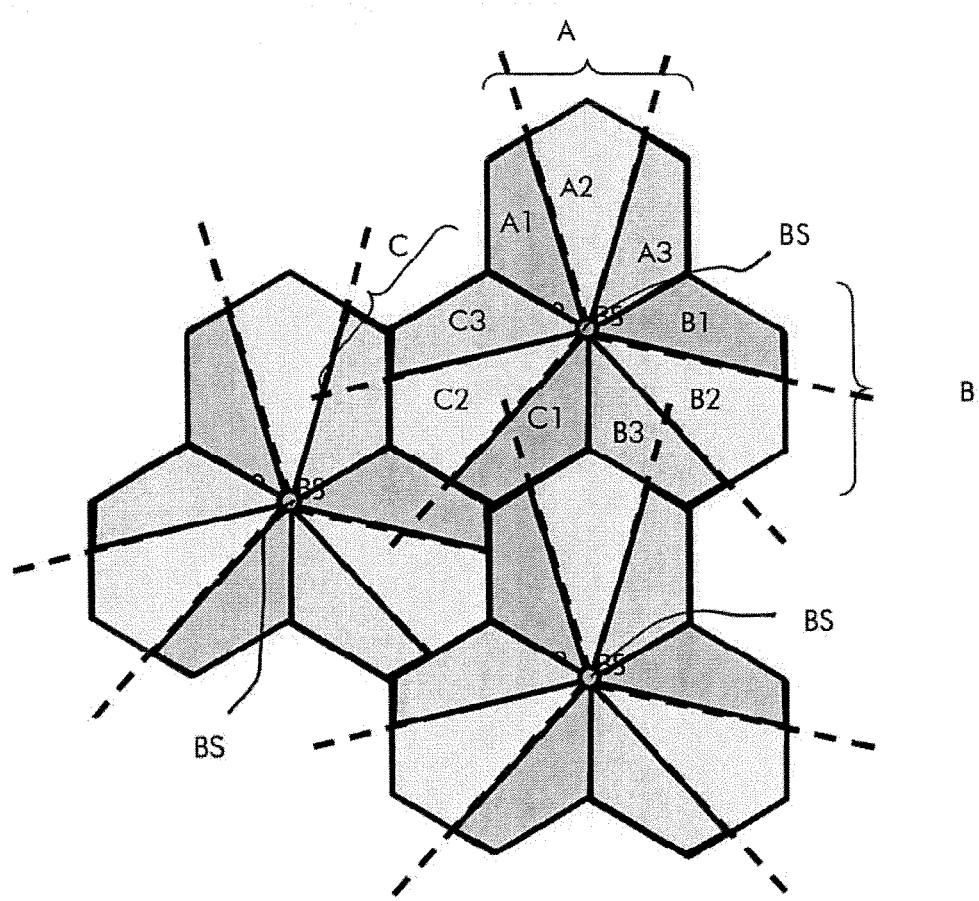
FIG. 1 shows a frequency subchannel allocation method in a wireless cellular wireless communication network known in the art.
Figure 2A:
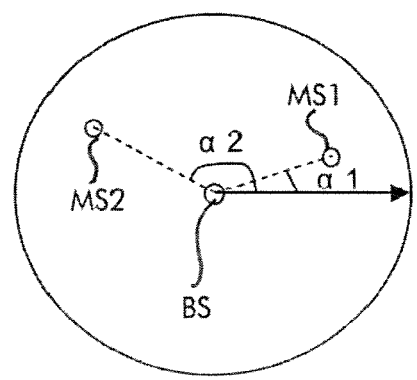
FIG. 2a, 2b, 2c show frequency subchannel allocation methods according to the present invention.
Figure 2B:
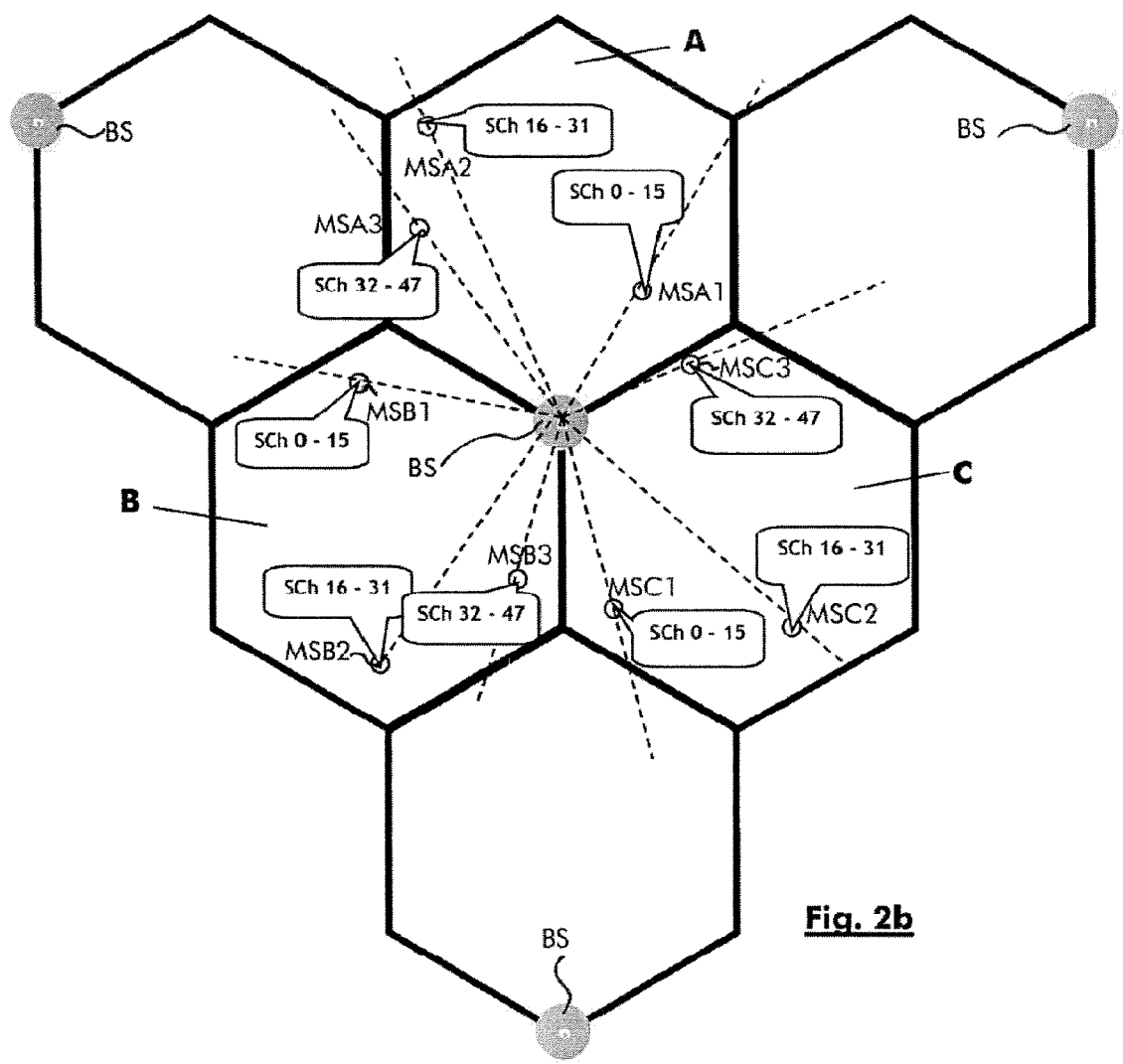
Figure 2C:
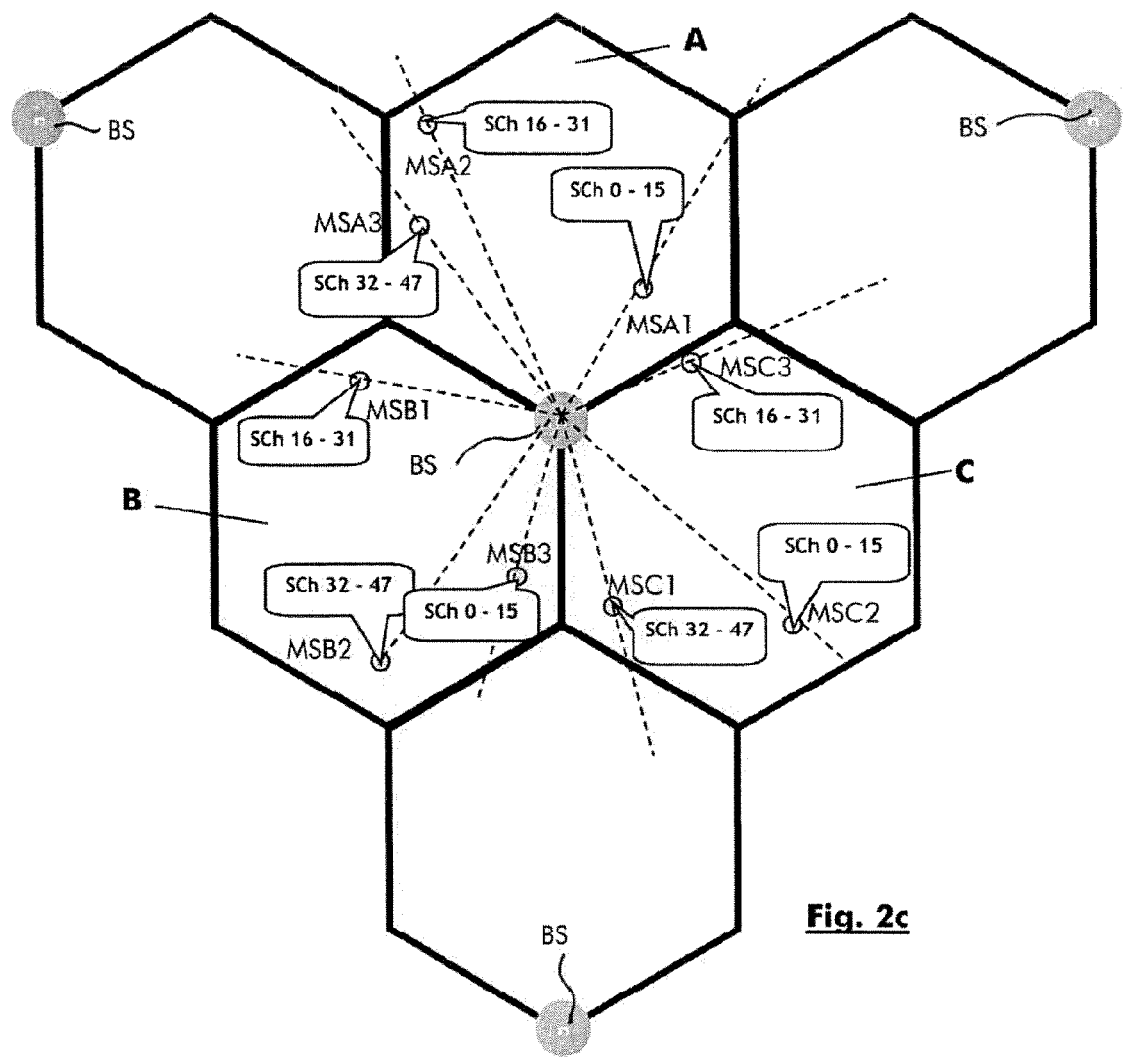

FIG. 1 showing a frequency subchannel allocation method in a wireless cellular wireless communication network known in the art has been described in connection with the state of the art in the opening part of the present patent application;

FIGS. 2a, 2b, 2c show frequency subchannel allocation methods according to the present invention.

FIG. 2a shows a simplified situation of a base station BS using an omnidirectionnal antenna, its surrounding cell, and two users MS1, MS2 under the coverage of the cell.

According to the present invention, the angular position of the users is determined. Practically, a reference direction looking out from the base station BS is chosen corresponding to angular position 0. The angle between the direction of a user MS1, MS2 and the reference direction corresponds to the angular position of this user. In the present example, MS1 has an angular position $\alpha 1$ and MS2 has an angular position $\alpha 2$. The frequency subchannels are attributed to one user depending on its own angular position and on the angular position of at least one other user.

In this example, the order of users with increasing angular position is determined. An order of the frequency subchannels is also predefined. After that the mapping takes place.

The first user in the order is assigned one or more frequency subchannels following the predefined order of the frequency subchannels. In a simple scenario, the order of the subchannels may be defined by ascending frequency.

In a simple scenario, only one frequency subchannel may be allocated per user. Alternatively, each user may be allocated a predefined number of frequency subchannels depending on its needs. The determination of the number of subchannels each user requires may be performed at the scheduler according to well known methods which are out of scope of the present invention.

FIG. 2b shows a first implementation of the method according to the present invention in a 3-sectored base station each sector having an angle of 120°. It will be understood by a person skilled in the art that the invention is applicable to any N-sectored based station known in the art, and that the angular size of the sectors may differ from one sector to the other without departing from the scope of the present invention.

In this embodiment, a base station BS is surrounded by sectors A, B and C. For illustration purpose, 3 users are available in each sector MSA1, MSA2, MSA3 sorted in increasing angular position in sector A, MSB1, MSB2, MSB3 sorted in increasing angular position in sector B, MSC1, MSC2, MSC3 sorted in increasing angular position in sector C.

A predefined number of subchannels (here 48) is available for communication and can be used simultaneously in all three sectors to reach a frequency reuse one network. According to the present invention, the subchannels are allocated to the users in a sector depending on the angular position of this user and the angular position of the other users in this sector.

In this embodiment, the frequency subchannels are allocated with increasing frequency. The user with the lowest angular position MSA1 is allocated the 16 first subchannels. The user with the next lowest angular position MSA2 is allocated the next 16 subchannels. Finally, the user with highest angular position MSA3 is allocated the next 16 subchannels. The same process is repeated in sectors B and C.

FIG. 2c shows another advantageous implementation of the method according to the present invention in a 3-sectored base station each sector having an angle of 120°.

In this embodiment, a base station BS is surrounded by sectors A, B and C. For illustration purpose 3 users are available in each sector MSA1, MSA2, MSA3 sorted in increasing angular position in sector A, MSB1, MSB2, MSB3 sorted in increasing angular position in sector B, MSC1, MSC2, MSC3 sorted in increasing angular position in sector C.

A predefined number of subchannels (here 48) is available for communication and can be used simultaneously in all three sectors to reach a frequency reuse one network.

As many subchannel groups are defined as users located in the different sectors, here for sake of simplicity 3 groups are defined: SCG1, SCG2, SCG3. SCG1 contains the 16 first subchannels: 0 to 15, SCG2 contains the 16 next subchannels: 16 to 31, SCG3 contains the 16 next subchannels: 32 to 47.

The subchannels are allocated to the users in a sector depending on the angular position of this user and the angular position of the other users in this sector but also according to the subchannel order used in an adjacent sector of the base station.

In sector A, the user with the lowest angular position MSA1 is allocated the SCG1. The user with the next lowest angular position MSA2 is allocated SCG2. Finally, the user with highest angular position MSA3 is allocated SCG3.

In sector B, MSB1 is allocated SCG2, MSB2 is allocated SCG3, MSB3 is allocated SCG1.

In sector C, MSC1 is allocated SCG3, MSC2 is allocated SCG1, MSC3 is allocated SCG2.

This embodiment presents the advantage to reduce the inter cell interference when the method is used similarly in different neighboring cells.

It will be understood by a person skilled in the art that the method according to the present invention, may be applied to any number of sectors in a cell, to any number of users in a cell. Moreover the frequency subchannel groups may be of identical or of different size without departing from the scope of the present invention.

In a further embodiment of the present invention, if too many users are requiring resources in a sector, groups of users to be served simultaneously may be defined. Preferably, the angular position of users belonging to one group should be selected as apart from one another as possible. The different user groups are scheduled at different time intervals.

Figure 3:
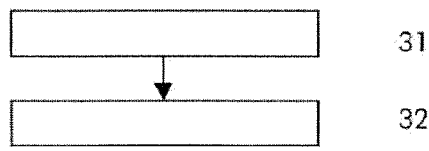
FIG. 3 shows a flow diagram for the different steps of the method according to the present invention

FIG. 3 shows a flow diagram for the different steps of the method according to the present invention.

Step 31 consists in determining an angular position of the users under the coverage of a cell with respect to the base station. This can be done by different methods.

One solution would consist in using uplink antenna array processing. A receiver algorithm is carried out generating an identical beam pattern as the beam pattern that would be used for transmission using beam steering in the downlink for transmitting data towards the user. Preferably, the uplink beam steering generates a characteristic beam form with a main lobe towards the user currently considered. The direction of this main lobe is used to determine the angular position of the user currently considered.

Such a beam steering algorithm generating a typical main lobe with one significant maximum in one direction of the strangest path may be an algorithm known as "principal component" beamformer. It is to be noted that uplink receive algorithm as e.g. Maximum Ratio Combining (MRC) may be used in certain conditions for determining an angular position. The MRC may generate different beams with different gains in all directions from where the signal arrives. This can only be exploited in case one of the different beams is large enough compared to the others that the angular direction can be unambiguously identified.

Alternatively, the angular position of the user may be determined by other means as a GPS position report from the user to the base station, the base station knowing itself its position, the angular position of the user relative to the base station can be derived easily.

It will be understood by persons skilled in the art that other known methods may also be applied.

Step 32 consists in selecting at least one frequency subchannel to be assigned to a user depending on its angular position and the angular position of at least one other user under the coverage of the cell.

An easy way of performing the mapping of the frequency subchannels to the users consists in ordering the users requiring a subchannel allocation in increasing order of their angular positions relative to a reference in the cell or in a sector of a cell. Then, the subchannel frequencies are allocated to the ordered list of users also in increasing frequency order.

One or several frequency subchannels may be allocated to each user depending on its needs in term of bandwidth. These needs are usually evaluated by a scheduling algorithm depending on the bandwidth negotiated by the user in a connection request phase.

Any other mapping of the frequency subchannels to the users may be under the scope of the present invention as long as this mapping takes into account the relative position of the users to each other and not the absolute angular position of the user relatively to the base station.

In an embodiment of the present invention, the cell may be divided in a predefined number of sectors looking out from the base station. In each sector the whole spectrum of frequency subchannels may be allocated to the users belonging to this sector under the condition that the inter-sector interference is kept low. The method described above may be applied in at least two or each of the sectors.

In a first embodiment of the present invention, the frequency subchannels are allocated in the same order in each sector. This method will be called also "Angular Sorting". The method ensures that the subchannels used in the area of the sector with lower angles is different from the subchannels used in the higher angle range.

Applied to a 3-sectored base station, the assignment of subchannels to the users in growing angular position is identical. The relation between sector number and ordering of subchannels for allocation to users is given in the following table (total number of available subchannels is N):

| | ordering of subchannels to be assigned in ascending order according to the angular value of the user location | | |
|---|---|---|---|
| sector A | SCh1 ... SCh N/3 | SCh N/3 + 1 ... SCh 2N/3 | SCh 2N/3 + 1 ... SCh N |
| sector B | SCh1 ... SCh N/3 | SCh N/3 + 1 ... SCh 2N/3 | SCh 2N/3 + 1 ... SCh N |
| sector C | SCh1 ... SCh N/3 | SCh N/3 + 1 ... SCh 2N/3 | SCh 2N/3 + 1 ... SCh N |
| User ordered with increasing angle | low angles >30° | -> | high angles <150° |

If the users are equally distributed over the angles range and use the same number of subchannels each, this results in the same performance as with fixed subsectorization with a number of subsectors corresponding to the number of users. If the number of subchannels per user is different, this results in a dynamic subsectorization, which can change for each frame. For the overall SINR still a gain is achieved.

In a further embodiment of the present invention, further interference reduction may be achieved, if for the assignment of subchannels in the sectors of a base station different well-defined orders of subchannels are used. This method will be called also "Permuted Angular Sorting". These different orders in the sectors may be identical for each base station site within the system without causing additional interference.

A preferred ordering of subchannels consists in dividing the frequency subchannel range in a number of ranges, the number of ranges being equal to the number of sectors around the base station. The order in which the frequency subchannels are allocated to the users in a sector depending on their angular position is obtained as a permutation of the order of at least two groups of frequency subchannels used in an adjacent sector.

In this embodiment, the interference at sector borders is reduced compared to the embodiment with no permutation of the frequency subchannel order described above. In addition, the center part of the sectors is less affected by the interference from the surrounding base stations, which leads to further improved throughput and coverage.

A specific procedure of permutation falling under this general idea and applied to a 3 sectored based station is described as follows:

1—The users are sorted according to their angle with respect to the base station.

2—In sector 1, the assignment of the subchannels to the users is in increasing order of the frequency subchannels.

3—In the sectors 2 and 3, the assignment of subchannels to the users is permuted, depending on the sector number. The relation between sector number and ordering of subchannels for allocation to users is given in the following table (total number of available subchannels is N):

| | ordering of subchannels to be assigned in ascending order according to the angular value of the user location | | |
|---|---|---|---|
| sector A | SCh1 ... SCh N/3 | SCh N/3 + 1 ... SCh 2N/3 | SCh 2N/3 + 1 ... SCh N |
| sector B | SCh 2N/3 + 1 ... SCh N | SCh1 ... SCh N/3 | SCh N/3 + 1 ... SCh 2N/3 |
| sector C | SCh N/3 + 1 ... SCh 2N/3 | SCh 2N/3 + 1 ... SCh N | SCh1 ... SCh N/3 |
| User ordered with increasing angle | low angles >30° | -> | high angles <150° |

In still another embodiment of the present invention, and especially in case of a large number of users, only a subset of these users is scheduled at the same time. The subsets of users are separated in time domain. In a simple example instead of scheduling 12 users for the whole frame length, the users may be grouped into 3 subsets of 4 users, each subset is then scheduled for ⅓ of the frame duration. The sorting into the subsets is as follows:

The users to be scheduled in the frame are sorted according to their angle with respect to the base station (angle range e.g. 30° ... 150° in a 120° sector).

The users are numbered in order of their angle to the base station (in the example from 1 to 12, increasing with angle to the base station)

The first subset is built using user number 1, 4, 7, 10.

The second subset is built using user number 2, 5, 8, 11
The third subset is built using user number 3, 6, 9, 12
For each of these subsets, either "Angular Sorting" or "Permuted Angular Sorting" as described above is applied. Due to this procedure, the angular separation between users building a subset is increased compared to the case of scheduling all 12 users at the same time.

This procedure is not restricted to 12 users. It can be defined in general with the number of simultaneously scheduled users U and the number of subsets S as parameter. If the total number of users is M, then the subsets can be built in general as follows:

| Subset | User number | | | | |
|---|---|---|---|---|---|
| 1 | 1 | Floor(1 + S) | Floor(1 + 2S) | ... | Floor(1 + (1 − U) * S) |
| 2 | 2 | Floor(2 + S) | Floor(2 + 2S) | ... | Floor(2 + (1 − U) * S) |
| ... | ... | ... | ... | ... | ... |
| S | S | Floor(S + S) | Floor(S + 2S) | ... | Floor(S + (1 − U) * S) |

FIG. 4 shows an implementation of a radio resource allocation module according to the present invention. The radio resource allocation module comprises means 41 for determining an angular position of the users under the coverage of a cell with respect to the base station belonging to said cell connected with means 42 for selecting at least one frequency subchannel to be assigned to said users depending on their angular position with respect to said base station. If not stand alone, the radio resource allocation module may be part of a scheduler or a frame builder or any other appropriate module in the network.

The invention claimed is:

1. A method for allocating frequency subchannels on an air interface of a wireless communication system to users for a predefined time period, a plurality of frequency subchannels being available for communicating between a base station belonging to a cell and users under the coverage of said cell requiring a frequency subchannel allocation, said method comprising:
    via a radio resource determination module determining an angular position of the users under the coverage of a cell relative to a reference position in said cell;
    selecting at least one frequency subchannel to be assigned to a user depending on the angular position of the user and on the angular position of at least one other user;
    wherein at least one subset of said users under the coverage of said cell are selected and applying said method during at least a part of said predefined time period, said selection being made depending on the angular position of said users; and
    wherein users in the at least one subset have a difference of angular position higher than a predefined threshold.

2. The method according to claim 1, wherein a cell is subdivided into a predefined number of sectors looking out from the base station belonging to said cell, a plurality of subchannels being usable simultaneously in at least two sectors of said cell, the method being applied in said at least two sectors independently.

3. The method according to claim 2, wherein the order in which the frequency subchannels are allocated to the users depending on their angular position is the same in said at least two sectors.

4. The method according to claim 2, wherein the order in which the frequency subchannels are allocated to the users in a sector depending on their angular position is obtained as a permutation of the order of at least two groups of frequency subchannels used in an adjacent sector.

5. The method according to claim 1, wherein said angular position of the user is determined by an uplink antenna array processing algorithm in reception at said base station.

6. The method according to claim 1, wherein said method is used in an OFDM radio communication system.

7. A radio resource allocation module adapted to be used in a wireless communication system for allocating frequency subchannels on an air interface to users for a predefined time period, a plurality of frequency subchannels being available for communicating between a base station belonging to a cell and users under the coverage of said cell requiring a frequency subchannel allocation, said radio resource allocation module comprising:
    a radio resource determination module configured to determine an angular position of the users under the coverage of a cell relative to a reference position in said cell;
    a selector configured to select at least one frequency subchannel to be assigned to a user depending on the angular position of the user and on the angular position of at least one other user;
    wherein at least one subset of said users under the coverage of said cell are selected during at least a part of said predefined time period, said selection being made depending on the angular position of said users; and
    wherein users in the at least one subset have a difference of angular position higher than a predefined threshold.

8. The radio resource allocation module according to claim 7, wherein a cell is subdivided into a predefined number of sectors looking out from the base station belonging to said cell, a plurality of subchannels being usable simultaneously in at least two sectors of said cell, the selector being applied in said at least two sectors independently.

9. The radio resource allocation module according to claim 8, wherein the order in which the frequency subchannels are allocated to the users depending on their angular position is the same in said at least two sectors.

10. The method according to claim 8, wherein the order in which the frequency subchannels are allocated to the users in a sector depending on their angular position is obtained as a permutation of the order of at least two groups of frequency subchannels used in an adjacent sector.

11. The radio resource allocation module according to claim 1, wherein said radio resource configuration module is further configured to determine angular position of the user by an uplink antenna array processing algorithm in reception at said base station.

12. The radio resource allocation module according to claim 1, wherein said wireless communication system comprises an OFDM radio communication system.

* * * * *